United States Patent [19]

Scheifley et al.

[11] 4,125,593
[45] Nov. 14, 1978

[54] COMBUSTION OF HALOGENATED HYDROCARBONS

[75] Inventors: John C. Scheifley, Lake Jackson; Clark R. Shields, Angleton; David E. Busby, Lake Jackson, all of Tex.

[73] Assignee: The Dow Chemical Company, Midland, Mich.

[21] Appl. No.: 710,960

[22] Filed: Aug. 2, 1976

[51] Int. Cl.² ............... C01B 7/01; B01D 53/34
[52] U.S. Cl. .................. 423/481; 423/210; 423/240; 423/488; 432/72; 122/2; 122/149; 422/182; 422/200; 422/241
[58] Field of Search ............ 122/149, 150, 2; 423/240, 210, 241, 481, 488; 110/8 A, 14; 23/262, 277 R, 277 C; 432/72, 223

[56] References Cited

U.S. PATENT DOCUMENTS

| 1,751,533 | 3/1930 | Taylor | 122/149 |
|---|---|---|---|
| 2,264,226 | 11/1941 | Toner | 122/149 |
| 2,888,910 | 6/1959 | Loebel | 122/149 |
| 2,892,451 | 6/1959 | Brown, Jr. et al. | 122/149 |
| 3,140,155 | 7/1964 | Cull et al. | 423/481 X |
| 3,232,280 | 2/1966 | Loebel et al. | 122/149 |
| 3,259,108 | 7/1966 | Craig et al. | 122/149 |
| 3,649,187 | 3/1972 | Fisher | 423/522 |
| 3,716,339 | 2/1973 | Sigaki et al. | 110/14 X |
| 3,984,206 | 10/1976 | Winnen | 423/481 X |

Primary Examiner—Earl C. Thomas
Attorney, Agent, or Firm—W. J. Lee

[57] ABSTRACT

Halogenated hydrocarbon materials are burned in an internally-fired horizontal fire-tube boiler and the heat of combustion directly produces saturated steam. Halogen values may be recovered from the combustion gases, e.g., by being absorbed in water. Thus halogenated hydrocarbon material which may need to be disposed of, is beneficially converted to energy and useful product.

8 Claims, 3 Drawing Figures

COMBUSTION OF HALOGENATED HYDROCARBONS

BACKGROUND OF THE INVENTION

It is ecologically unacceptable to release halogenated hydrocarbons into the atmosphere or into public waters. Among the methods used in attempts to abate such pollution has been combustion (thermal oxidation) of the halogenated hydrocarbons in bricklined furnaces or other refractory furnaces. There have been some attempts to extract some of the heat values and chemical values by heatexchange and aqueous scrubbing of the combustion gases which are emitted from the refractory furnace.

It is the field of thermal oxidation of halogenated hydrocarbons to which the present invention most closely pertains. More precisely, the invention pertains to thermally oxidizing halogenated hydrocarbons in such a manner that the heat of combustion and the halogen values in the combustion product are recovered, thus salvaging valuable energy and chemical values.

It is an object of the present invention to provide for improved disposal of halogenated hydrocarbons by employing thermal oxidation.

It is a further object to provide for combusting of halogenated hydrocarbons in such a manner that pollution of public waters and the atmosphere is abated.

It is also an object to provide for combusting of halogenated hydrocarbons in such a manner that valuable energy and chemical values are recovered.

Another object is to provide a horizontal fire-tube boiler which has been modified so as to withstand the highly corrosive gases from the thermal oxidation of halogenated hydrocarbons for extended periods of time.

These, and other objects, are attained by performing the combustion (thermal oxidation) of halogenated hydrocarbons in accordance with the present invention.

SUMMARY OF THE INVENTION

It has now been found, surprisingly and unexpectedly, that halogenated hydrocarbons can be burned, generally along with a supplemental fuel, directly in the water-cooled combustion chamber of a horizontal fire-tube boiler and that the intense corrosion of the water-cooled metal surfaces in contact with the hot combustion gases which one would expect to get are substantially avoided by carefully controlling the pressure of the saturated steam which is produced in the boiler. Corrosion of other boiler surfaces which are contacted by the hot corrosive gases, and which are not water-cooled, are either constructed of corrosion-resistant material, e.g., nickel or nickel alloy, or else are protected by insulation which keeps the metal surfaces in the desired temperature range at which corrosion is substantially minimized.

In its broadest sense the present invention comprises the combustion (thermal oxidation) of halogenated hydrocarbon fuels directly in a modified horizontal fire-tube boiler wherein the heat of combustion is transfered through the metal walls directly into water to make saturated steam and to substantially cool the combustion gases. Preferably, the combustion gases are then passed into contact with liquid-absorbents, e.g., water-scrubbers, to recover halogen values.

As used herein, the terms "halogenated hydrocarbon" and "halogenated hydrocarbons" refers to single chemical entities or to mixtures of various halogenated hydrocarbons. The halogenated hydrocarbons may be either liquid or gaseous or both.

DETAILED DESCRIPTION OF THE INVENTION

Halogenated hydrocarbons are thermally oxidized to gaseous products $CO_2$, $H_2O$, $HX$ (X=halogen), and some free halogen by being burned in an excess of air in a horizontal fire-tube boiler in which water is directly heated to form useable saturated steam and, preferably, the halogen values are collected from the exit gases by an aqueous scrubber. The fire-tube boiler is substantially of a conventional design, but since such conventional fire-tube boilers are not normally intended for use with highly corrosive fuels, it has been found to be advantageous to employ corrosion resistant surfaces at certain places in the boiler. The fire-tube boiler comprises, basically, a boiler section, a front-end section, and a rear section. The boiler section is essentially a horizontally-positioned shell and tube heat-exchanger. This heat-exchanger comprises a shell having its ends closed with tube-sheets. Extending between and communicating through the tube-sheets are a plurality of tubes. One of the tubes is a relatively large-diameter tube, herein called combustion chamber or furnace, and a plurality of smaller tubes, herein called return-tubes.

The front-end section, sometimes referred to in the industry as a front-end door or front door, can, conveniently, be swung open or removed, even partly, to expose the front tube-sheet of the boiler section and allow inspection or maintenance to be performed. The front-end section contains the feed means for transmitting air, supplemental fuel, and halogenated hydrocarbon fuel into the burner which is positioned at about the front-end of the combustion tube. The front-end section may contain baffles, as needed, to cause flow of hot gases entering it to flow back through the fire-tube boiler through a different set of return-tubes.

The rear section which, conveniently, can be swung open, may also contain baffles, as needed, to cause the flow of hot gases to flow back through the fire-tube boiler through a different set of return-tubes. The rear section may, conveniently, contain one or more ports or sight glasses for inspection or observation purposes. The inner surfaces of the rear section may be lined with a refractory material or other such insulation which will help prevent heat losses and help protect the metal from the hot, corrosive gases. Optionally, the rear section may be water-cooled by having water circulate between an inner wall and the outer wall or by having water flow through tubes which are juxta-positioned with the inside of the rear section wall.

Operation of the process is performed by mixing air, supplemental fuel (as needed), and halogenated hydrocarbon to provide a combustible mixture to the combustion chamber. The mixture is then burned in the combustion chamber. The ratio of supplemental fuel/halogenated hydrocarbon is adjusted to maintain flame stability and high halogen conversion to HX. The amount of supplemental fuel can vary from 0 to about 95% of the total heat input, depending on the heating value and the uniformity of the halogenated hydrocarbon which is being burned. The higher the heating value of the halogenated hydrocarbon, the less supplemental fuel is needed.

The water flow through the fire-tube boiler is adjusted to maintain a water level covering all the tubes; it is critical to keep all the tubes submerged to prevent their overheating. It has been found that corrosion is held to a surprisingly low minimum by operating in a manner to produce saturated steam at a pressure in the range of about 150 to about 275 psig., even when the fire-tube boiler is constructed of relatively inexpensive metals, such as carbon steel which is commonly and conventionally used to construct ordinary boilers. In this steam pressure range, the water in the boiler is maintained at a temperature in the range of about 186° to about 210° C. and this, along with maintaining scale-free metal surfaces on the water side of the boiler, keeps the walls of the furnace, return-tubes and tube-sheets which are exposed to the hot corrosive gases, at about 200° C. to about 250° C. If the steam pressure is allowed to drop below about 150 psig the walls of the furnace, return-tubes, and tube sheets can cool down to the point (downwards from 200° C.) at which accelerated corrosion is encountered. On the other hand, if the pressure is allowed to climb upwards much above 275 psig, the walls of the furnace, return-tubes, and tube-sheets can approach 300° C. or more (especially if any scale has formed) and severe corrosion may be encountered.

It is essential that care be taken to assure that the water in the boiler be non-scale-forming so as to substantially avoid formation of scale on the water side of the return-tubes, tube-sheets and combustion chamber. If significant amounts of scale accumulate on these surfaces, heat transfer through these metal walls is adversely affected and the resulting higher wall temperature on the combustion gas side of the walls will cause severe corrosion rates. Persons skilled in the art of boiler water control are aware of the various water treatments which are customarily used for prevention of scale. The exact nature of any scale-inhibitors or other means used for avoiding scale formation is not especially critical. Obviously, ingredients in the water which are corrosive or will cause substantial oxidation of the metal surfaces should be avoided or inhibited.

The expression "fire-tube boiler" as used herein refers to commonly used and well-known boilers which have water-cooled combustion chambers and which are called "stationary, horizontal, internally-fired, fire-tube boilers." These boilers are available commercially and can be built, or modified, to be multi-pass, e.g., two-pass, three-pass, four-pass, or more passes. The expression "pass" refers to the travel of the combustion gases through one or more tubes in one direction; a second "pass" occurs when the hot gases travel in the reverse direction through one or more other tubes. In multiple-pass boilers, the flow of gases in each "pass" is through one or more tubes not used in another "pass".

Figure 1:
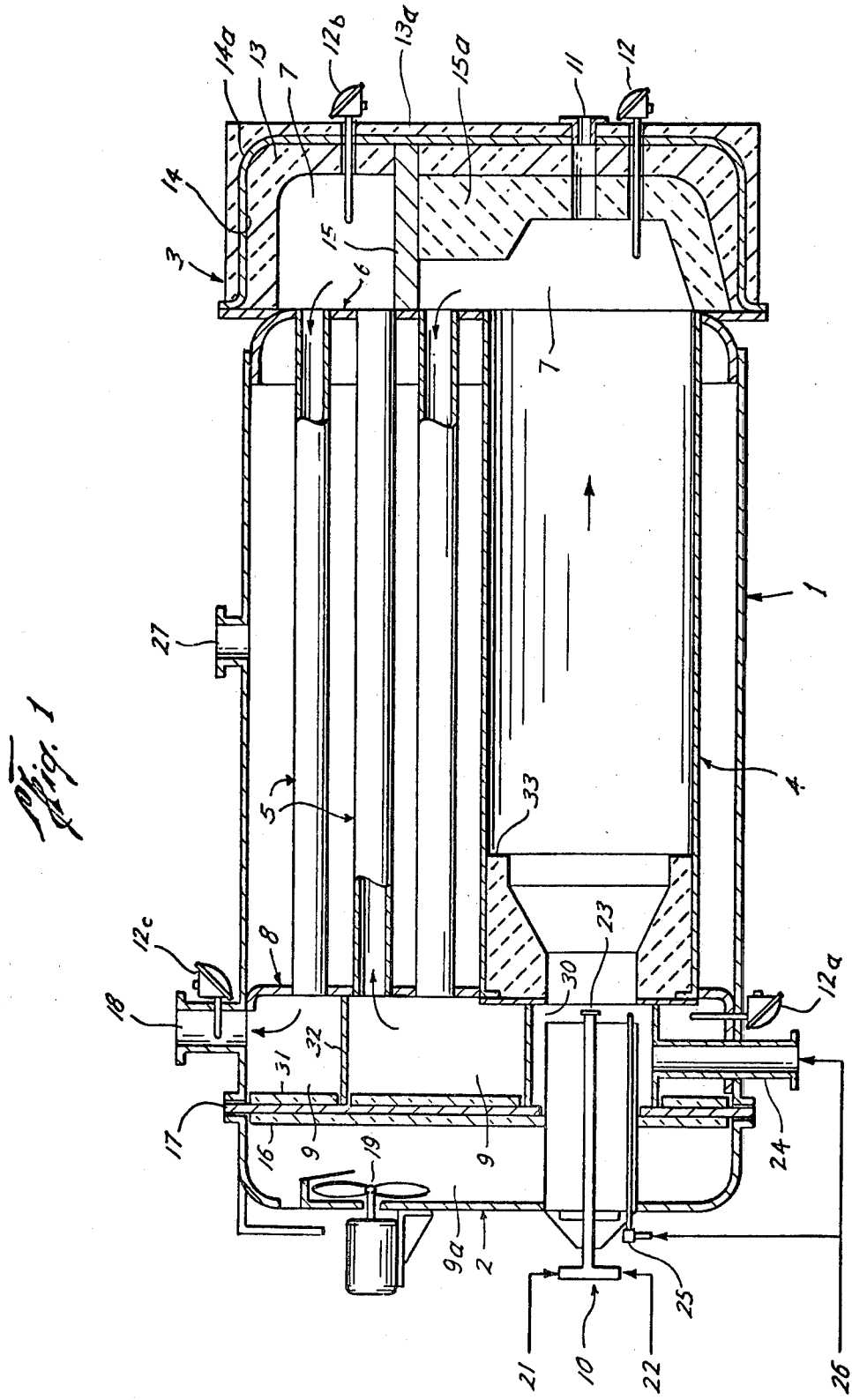
FIG. 1 depicts a cross-section view, not to scale, showing the principal features of a horizontal fire-tube boiler.

A common embodiment of a fire-tube boiler, modified according to the present invention, is defined, generally, by reference to FIG. 1 which is a cross-sectional view depicting the essential main parts of the boiler, as a boiler having a boiler section 1, a front-end section 2, and a rear section 3. The boiler section comprises a horizontal combustion chamber 4 in parallel alignment with a plurality of return-tubes 5, said combustion chamber and return-tubes being positioned within said boiler section, terminating at the tube-sheets 6 and 8 at the ends of the boiler section and communicating with the space contained within 3, said space within 3 being designated as 7. The other ends of the return-tubes and combustion chamber terminate at tube-sheet 8 and communicate with the space contained within 2 said space within 2 being designated, generally, as 9. A supplemental fuel, air, and halogenated hydrocarbon feeder device (denoted generally as 10 communicates from the supplemental fuel, air, halogenated hydrocarbon supply lines through front end section 2 and through space 9 into combustion chamber (or furnace) 4. Conveniently, there is a sight glass 11 through rear section 3 which allows one to observe the burning in the combustion chamber. Also, conveniently, there is a thermocouple 12 protuding through rear section 3. The interior wall surface 14 of rear section 3 is conveniently lined with refractory material or high-temperature insulation 13. The external wall surface 14a nay be water-cooled by, e.g., water conduits (not shown) or may be protected against the vagaries of weather and against loss of heat by refractory or insulation material 13a. The wall defining section 3 should be protected against contact with corrosive agents, e.g. HCl. Preferably the amount of insulation used at 13 and 13a is selected on the basis of keeping the wall in the range of about 200° C. to about 250° C. during the combustion of halogenated hydrocarbon, thereby minimizing the corrosive effect if any halogen acid compounds do come in contact with the wall. The space within rear section 3, which is designated as 7 may be divided into two or more separate spaces, if desired, by using one or more corrosion-resistant baffles 15 which direct flow of hot gases back through return-tubes not yet travelled. In space 7, at the area at which hot combustion gases from the combustion chamber impinge on the inner surface of the insulation or refractory 13, there is preferably installed a corrosion-resistant material 15a which is selected for its ability to withstand hot, corrosive material over a substantial length of time and also to help in avoiding heat losses. Many refractories are known which will withstand the hot, corrosive gases encountered in the present invention.

Within section 2 there may be, if desired, one or more baffles 32 to direct the flow of hot gases through the appropriate return-tubes. The space within section 2 may be divided into two major spaces 9 and 9a by the use of a barrier wall 17 having a corrosion-resistant or insulated surface 31 and an insulated surface 16 which serve to keep the wall 17 in the desired temperature range during operation. The inner major space 9, which may contain one or more baffles 32 carries the hot gases which flow from space 7 until the gases eventually flow from the exit 18 provided and on to further processing. Depending on the number of passes, exit 18 may communicate with space 7 instead of space 9. The feeder device 10 communicates through spaces 9a and 9 into the combustion chamber 4. The space within the feeder device does not communicate with space 9. Passages (not shown) in the walls of the feeder device receive air from space 9a. Air may be supplied to space 9a by means of forced air 19 or by being drawn in with induced draft attained by drawing exit gases out through exit 18. Damper means (not shown) may be employed on the feeder device 10 to regulate the amount of air reaching the burner.

In one embodiment of an actual operation atomizing air 21 and halogenated hydrocarbon 22 are mixed in a feed line approximately centrally located within feeder device 10 and are thereby supplied to the atomizing nozzle 23 of the feeder device. Supplemental fuel gas 26 is fed to the pilot 25 and/or through the vapor inlet pipe 24 and through openings 30 where it mixes with air 19 in the region of the nozzle 23. Chlorinated hydrocarbon 10 vapors may also be conveniently fed to the burner through pipe 26. The mixture of air, fuel and halogenated hydrocarbon is mixed and burned in combustion chamber 4, the hot gases passing into one portion of space 7, then through a plurality of return-tubes 5 to one portion of space 9, then through a plurality of return-tubes 5 into another portion of space 7, then back to another portion of space 9 where it then exits 18 the boiler into other processing equipment (not shown in FIG. 1). During operation non-scaling water is supplied to the boiler so as to completely surround the return-tubes and the combustion chamber. The combustion is regulated by adjusting the flow of fuel and/or air so as to maintain excess oxygen in the exit gases and to keep the temperature of the gases leaving the combustion chamber space near thermocouple 12 at not more than about 1100° C. and to maintain a saturated steam pressure in the range of about 150 to about 275 psig which gives a boiler water temperature in the range of about 186° to about 210° C. The desired water level is maintained by regulating the flow of make-up water. The desired pressure is maintained by regulating the flow of saturated steam from the boiler at steam vent 27 and/or by regulating the fuel mixture being fed to the combustion chamber.

Figure 2:
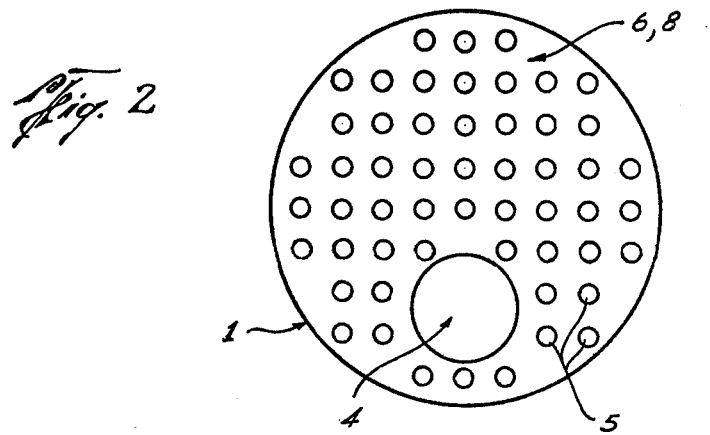
FIG. 2 depicts an end-view, not to scale, of a fire-tube boiler tube-sheet with end views of the combustion chamber and return tubes depicted.

FIG. 2 depicts an end-view of a fire-tube boiler section 1 and shows a plurality of return-tubes 5 communicating through tube-sheet 6 or 8. Combustion chamber 4 is considerably larger in diameter than the return-tubes.

Even though combustion chamber 4 is depicted as a straight-wall tube, practitioners of the art of fire-tube boilers will realize that the combustion chamber walls may be convoluted.

It will also be readily apparent that the positioning of baffles 15 and 32 should be done commensurately with the contracting volume of the gases as they cool during flow through the return-tubes. That is, the total cross-sectional area of the first "set" of return-tubes should be less than the cross-sectional area of the combustion chamber; the second "set" of return-tubes should have a total cross-sectional area less than the first "set" and so on. Thus, the gas velocity from one "pass" to another is kept high so as to keep heat transfer rates efficient.

In a typical operation in the depicted apparatus, the temperature profile in a boiler such as depicted in FIG. 1 will be: about 1200°–1600° C. (average) in the combustion chamber 4; about 500°–1100° C. in the area of thermocouple 12; about 280°–400° C. in first space 9, measured by thermocouple 12a; about 250°–320° C. in space 7, measured by thermocouple 12b; and about 215°–260° C. in second space 9, measured by thermocouple 12c as the gases leave through exit 18.

Figure 3:
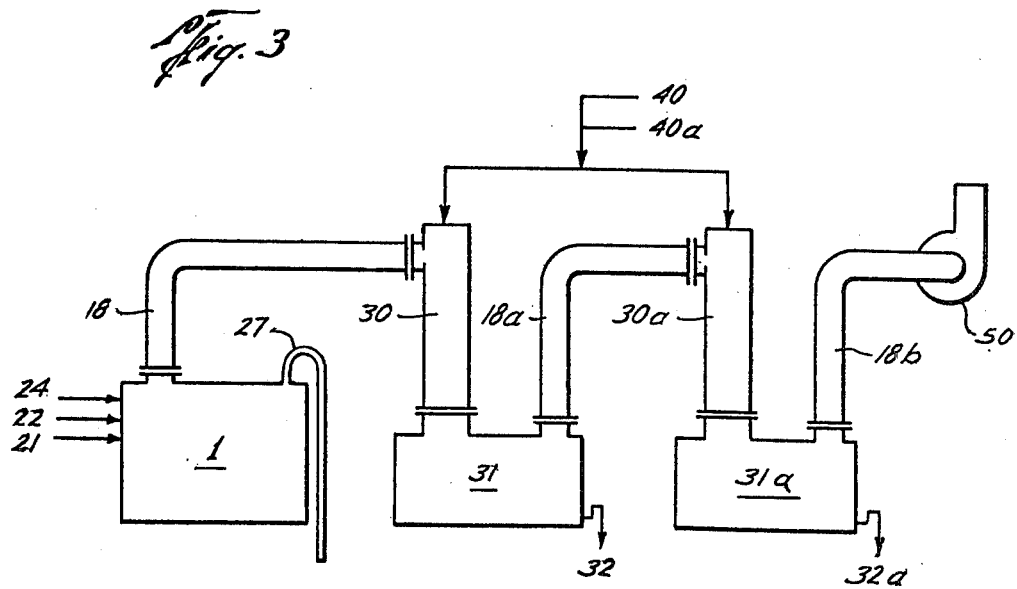
FIG. 3 is a flow-sheet diagram, not to scale, showing a generalized view of a fire-tube boiler and two scrubbing units (with appropriate piping) for halogen-recovery.

FIG. 3 is a flow-sheet diagram depicting an embodiment of the overall process wherein supplemental fuel 24, air 21 and halogenated hydrocarbon 22 are burned in a fire-tube boiler 1, combustion gases which exit are carried by conduit 18 to a liquid-contactor, e.g., an aqueous scrubber 30, through a separator 31 from which aqueous solution is drawn 32, then through conduit 18a to a second aqueous scrubber 30a, on through a second separator 31a from which aqueous solution is drawn 32a, then through a conduit 18b to a vent or other suitable processing. Water 40 and/or other appropriate aqueous scrubbing liquid, e.g. dilute caustic 40a is supplied to scrubbers 30 and 30a and aqueous solution is drawn from the separators at a rate commensurate with the flow of aqueous solution from the scrubbers. A blower or other appropriate gas-moving device 50 may be conveniently employed to enhance the flow of the combustion gases through the system and to safeguard against leaks of corrosive materials from the system in the event a leak occurs. By pulling the combustion gases through the system, a positive pressure is avoided, and in fact, a slightly reduced pressure within the system may be attained. Steam exits the boiler through vent 27 and is used elsewhere.

The supplemental fuel used in the burning process may be any of the lower hydrocarbons ordinarily employed as fuels, such as, methane, ethane, propane, butane, isopropane, isobutane, pentane, hexane, heptane, octane, isooctane or mixtures of these or may be L.P.G. (liquified petroleum gas). Any aliphatic hydrocarbon having 1–12 carbons, especially 1–4 carbons, are suitable. The most ordinary fuel and most preferred as supplemental fuel, is natural gas. Virtually any vaporizable or atomizable hydrocarbon may be employed, such as gasoline, kerosene, petroleum ether, fuel oil, no. 2 fuel oil, No. 4 fuel oil, Bunker C oil etc. Clean-burning fuels or clean-burning mixtures of fuels are preferred.

The "halogenated hydrocarbon" as used herein includes hydrocarbons which have chlorine, bromine, or iodine values. Usually the halogenated hydrocarbon desired to be burned according to the present invention is a waste stream of chlorinated hydrocarbon or mixture of chlorinated hydrocarbons. It is within the purview of the present invention to combine various streams containing chlorinated, brominated, or iodinated organics for burning. Fluorinated organics may also be mixed in for burning, but since fluorine values are normally so highly corrosive as to substantially limit the life of the equipment, it is best to hold the maximum amount of organic fluorides to a small percent. The present invention also contemplates that the air supplied to the burner may contain vapors of halogenated hydrocarbons, such as vinyl chloride and others, which may be swept from an area for protection of personnel in the area.

The following examples are meant to illustrate operation of some embodiments of the present invention. The scope of the invention is restricted only by the attached claims.

EXAMPLES

Various halogenated hydrocarbons were burned in a 4-pass fire-tube boiler substantially in accordance with the above teachings. The data are shown in Table I. The supplemental fuel was natural gas. The calculated average temperature in the furnace was the arithmetic average of measured outlet temp. and theoretical flame temperature, based on the measured temperature at the thermocouple 12 positioned at the end of the first pass. The steam pressure was maintained in the range of about 150 to about 275 psig and the water in the boiler was in the range of about 186° C. to about 210° C. The water level was maintained so as to completely cover the uppermost return-tubes. During operation a blower at the vent stack operated to pull excess air through the burner, through two aqueous caustic scrubbers in series and out through the vent stack.

The RCl's (halogenated hydrocarbons) in the vent gas were determined by entrapment in heptane followed by electron capture gas chromatography analysis except for Run Nos. 9, 11, and 12. Run Nos. 9 and 11 were determined by total organic chloride analysis of RCl's trapped in heptane and Run No. 12 was determined by trapping RCl's on activated charcoal, extracting with carbon disulfide and analyzing by hydrogen flame gas chromatography.

The RCl feed streams in Table I are identified as follows (percents are by weight):

A. Commercial grade propylene dichloride.
B. Waste mixture of about thirty different RCl's with elemental analysis of 32.8% C, 63.2% Cl, 4.0% H.
C. Waste mixture of 6 RCl's containing mostly dichloroisopropyl ether with elemental analysis 40.2% C, 43.6% Cl, 6.7% H, 9.5% O.
D. Waste mixture of about 23 RCl's containing mainly trichloroethane, trichlorobromopropane, and pentachloroethane; also contained hexachloroethane, hexachlorobutane, hexachlorobutadiene and had elemental analysis 17.2% C, 77.1% Cl, 4.6% H, 1.1% Br.
E. Waste mixture of about 13 RCl's containing mainly hexachlorobutadiene and symmetrical tetrachloroethane; also contained hexachloroethane and hexachlorobenzene and had elemental analysis of 17.5% C, 81.6% Cl, 0.9% H.
F. Waste mixture of about 14 RCl's containing mainly propylene dichloride, hexachloroethane, sym-tetrachloroethane; also contained hexachlorobenzene and had elemental analysis 24.5% C, 72.3% Cl, 3.2% H.
G. Waste mixture of about 5 RCl's containing mainly sym-tetrachloroethane, hexachloroethane, hexachlorobutadiene; 1.9 wt.% iron as Fe, 2.7 wt.% ash at 950° C.; elemental analysis 15.61% C, 82.96% Cl, 1.46% H.

fuel is burned therein in order to recover heat values and halogen values from said halogenated hydrocarbons, and where said fire-tube boiler contains corrosion resistant material on those inner surfaces which are in contact with the hot combustion gases but which are not directly cooled by water on their reverse sides, said method comprising, burning a mixture of air, halogenated hydrocarbon and optical supplemental fuel in the combustion chamber of a water-cooled horizontal fire-tube boiler which contains a combustion-tube and a plurality of return-tubes, removing saturated steam from the boiler in the pressure range of about 150 to about 275 psig, while adding water to the boiler at a rate sufficient to keep all the tubes submerged, thereby maintaining the water temperature in the boiler in the temperature range of about 186° C. to about 210° C., conveying the combustion gases through an aqueous scrubber to recover halogen values therefrom, and venting the resulting halogen-depleted gases from the system.

2. The method of claim 2 wherein the halogenated hydrocarbons are chlorinated organic compounds.

3. The method of claim 2 wherein the chlorinated organic compounds contain minor amounts of other halogenated organics.

4. The method of claim 1 wherein the mixture being burned contains supplemental fuel in an amount that the supplemental fuel provides about 0 to about 95% of the total input of heat to the boiler.

5. The method of claim 1 wherein the supplemental fuel is one or more aliphatic hydrocarbons having 1 to 20 carbon atoms.

6. The method of claim 1 wherein the supplemental fuel is selected from the group consisting of methane, ethane, propane, butane, isobutane, isopropane, no. 2 fuel oil, no. 4 fuel oil, no. 6 fuel oil, Bunker C oil or mixtures of two or more of these.

TABLE I

| | | Feed to Boiler Lb./Hr. | | Furnace Parameters | | | | | |
| Run No. | RCL Feed Stream | RCL | CH$_4$ | Calc. Ave. Temp. (° C) | T.C.* Temp. (° C.) | Residence Time (Sec.) | RCL in Outlet Gas (wt. ppm) | RCL Conversion (%) | Chlorine Conversion To HCl (%) |
|---|---|---|---|---|---|---|---|---|---|
| 1 | A | 66.5 | 9.6 | 1361 | 870 | 0.36 | 0.083 | 99.99++ | 97.9 |
| 2 | B | 74.0 | 17.0 | 1327 | 888 | 0.27 | 0.076 | 99.99++ | 98.9 |
| 3 | B | 64.8 | 17.3 | 1312 | 870 | 0.28 | 0.128 | 99.99++ | 98.9 |
| 4 | C | 88.0 | 8.5 | 1423 | 1050 | 0.24 | 0.234 | 99.99++ | 98.4 |
| 5 | C | 101.5 | 6.0 | 1374 | 990 | 0.22 | 0.203 | 99.99++ | 98.3 |
| 6 | D | 159.4 | 14.7 | 1291 | 790 | 0.33 | 8.06 | 99.99++ | 93.4 |
| 7 | D | 100.0 | 31.7 | 1339 | 875 | 0.24 | 1.57 | 99.99++ | 97.7 |
| 8 | E | 67.3 | 34.0 | 1293 | 837 | 0.25 | 1.13 | 99.99++ | NA** |
| 9 | E | 67.3 | 34.0 | 1293 | 837 | 0.25 | 0.53 | 99.99++ | NA |
| 10 | F | 96.6 | 19.1 | 1333 | 923 | 0.26 | 8.8 | 99.99++ | NA |
| 11 | F | 96.6 | 19.1 | 1333 | 923 | 0.26 | 1.98 | 99.99++ | NA |
| 12 | G | 75.1 | 26.4 | 1362 | 945 | 0.29 | 14.7 | 99.98++ | 99.3 |

*T.C. Temp. is measured by the thermocouple at end of first pass.
**NA: Not Analyzed It will be readily apparent to persons skilled in the art that other embodiments and modifications in the process and in the apparatus may be made without departing from the present invention.

We claim:

1. A method for avoiding rapid corrosion of the combustion-tube, tube-sheets, and return-tubes of a water-cooled horizontal fire-tube boiler as a mixture of air, halogenated hydrocarbons, and optional supplemental 7. The method of claim 1 wherein the halogenated hydrocarbons contain one or more halogenated organics which are a waste material.

8. The method of claim 1 when performed as a method of avoiding pollution and of recovering energy and chemical values in waste by-products containing halogenated hydrocarbons.

* * * * *

UNITED STATES PATENT AND TRADEMARK OFFICE
CERTIFICATE OF CORRECTION

PATENT NO. : 4,125,593
DATED : Nov. 14, 1978
INVENTOR(S) : John C. Scheifley, et al It is certified that error appears in the above-identified patent and that said Letters Patent are hereby corrected as shown below:

Column 3, line 10, "temporature" should be ---temperature---.

Column 4, line 12, after "(denoted generally as 10", the parenthesis should be closed with ---)---.

Column 4, line 22, after "14a" the word "nay" should be ---may---.

Column 5, line 62, "12cas" should be ---12c as---.

Column 6, line 4, "31afrom" should be ---31a from---.

Column 7, Table I, Run Nos. 8-11, the "NA" should be directly under the 97.7% chlorine conversion of Run No. 7.

Column 8, line 11, which is part of Claim 1, "optical" should be ---optional---.

Signed and Sealed this

Third Day of April 1979

[SEAL]

Attest:

RUTH C. MASON
Attesting Officer

DONALD W. BANNER
Commissioner of Patents and Trademarks